United States Patent
Minke et al.

(10) Patent No.: US 6,704,678 B2
(45) Date of Patent: Mar. 9, 2004

(54) METHOD AND APPARATUS FOR DOWNLOADING CORRECT SOFTWARE TO AN ELECTRICAL HARDWARE PLATFORM

(75) Inventors: Travis D. Minke, Thornton, CO (US); Bryan A. White, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 91 days.

(21) Appl. No.: 10/159,575

(22) Filed: May 31, 2002

(65) Prior Publication Data

US 2003/0225540 A1 Dec. 4, 2003

(51) Int. Cl.[7] .............................................. H04L 12/28
(52) U.S. Cl. ..................... 702/123; 702/117; 702/122; 702/123; 702/182; 702/188; 702/183; 702/120
(58) Field of Search ...................... 702/117–120, 122, 702/123, 182–184, 186, 188, FOR 134–135, FOR 137, FOR 170–171; 379/93.05, 93.07, 93.09, 67.1, 74, 88.01, 88.02, 88.04, 88.05, 88.07, 88.08, 88.17, 88.18, 88.22, 242, 245, 246, 284, 285, 399.01; 375/222, 220; 370/419, 230, 389

(56) References Cited

U.S. PATENT DOCUMENTS

| | | | | |
|---|---|---|---|---|
| 4,410,983 A | * | 10/1983 | Cope ........................... 710/100 |
| 4,527,012 A | * | 7/1985 | Caplan et al. ............... 379/284 |
| 5,291,479 A | * | 3/1994 | Vaziri et al. ................. 370/264 |
| 5,694,547 A | * | 12/1997 | Subramanian et al. ...... 709/224 |
| 5,774,545 A | | 6/1998 | Raghavachari |
| 5,825,765 A | * | 10/1998 | Menzilcioglu et al. .. 370/395.71 |
| 5,838,793 A | | 11/1998 | Lewis |
| 6,249,571 B1 | * | 6/2001 | Rojas ..................... 379/112.01 |
| 6,353,927 B1 | * | 3/2002 | Ali et al. ..................... 717/174 |
| 2001/0046230 A1 | * | 11/2001 | Rojas ........................... 370/389 |
| 2002/0184349 A1 | * | 12/2002 | Manukyan ................... 709/221 |
| 2002/0199044 A1 | * | 12/2002 | Futterman .................... 710/62 |
| 2003/0101042 A1 | * | 5/2003 | Ollive et al. ................... 703/25 |

* cited by examiner

Primary Examiner—Marc S. Hoff
Assistant Examiner—Carol S. W. Tsai
(74) Attorney, Agent, or Firm—John C. Moran

(57) ABSTRACT

Each type of peripheral device has a unique identification, and if this unique identification is not present in software that is being transferred to the peripheral device for installation on the peripheral device, the peripheral device rejects the software being transferred to it.

19 Claims, 5 Drawing Sheets

METHOD AND APPARATUS FOR DOWNLOADING CORRECT SOFTWARE TO AN ELECTRICAL HARDWARE PLATFORM

TECHNICAL FIELD

This invention relates to the transfer of software, and in more particular, to assuring that the transfer of software is performed correctly to the appropriate electrical platform.

BACKGROUND OF THE INVENTION

The existence of low cost high performance microcomputers and memory has lead to the implementation of these devices into a variety of peripheral units communicating with a central computer. For example, in telecommunication and data switching systems, a complex of central computers controls the overall operation of the telecommunications system; however, vital operations such as interfacing to digital and analog trunks, tone detection, voice response units, interface circuits to complex digital networks such as ATM or the Internet are all performed by individual units having a powerful microcomputer and millions of bytes of program. Within the telecommunication art, even such relatively simple operations as interfacing telephones to the switching network are performed by printed circuit boards having powerful microprocessors resident on the printed circuit board. Because the manufacturers of the microcomputers are constantly improving the microcomputers and discontinuing previously sold microcomputers, the circuit manufacturers of such systems as telecommunications systems face the constant challenge of redesigning these various peripheral devices so as to be able to obtain parts from the circuit manufacturers. This problem is further complicated by the fact that systems such as telecommunications systems or data switching systems constitute a large investment for the company purchasing these systems unit, and these companies are reluctant to update their systems. The end result is that the manufacturer of telecommunication systems or data switching systems are faced with the fact that in the field, they are supporting a number of vintages of peripheral printed circuit boards that are all slightly different and require different variations of the same software package. The problem faced by the telecommunication and data switching system manufacturers is providing updated software to this vast number of peripheral devices each of which is implemented on similar printed circuit card.

The problem is further complicated by the fact that for the manufacturers of these telecommunication or data switching systems, it is most economical to place new software on a central web site so that customers can access and update their own software after of course paying an appropriate fee.

The end result of these factors is that inappropriate software may be downloaded onto a printed circuit board causing not only the printed circuit board to cease to function but often causing the whole system to fail. Such a failure in the case of a telecommunication switching system or data switching system is catastrophic for many types of businesses and other entities.

SUMMARY OF THE INVENTION

This invention is directed to solving these and other problems and disadvantages of the prior art. Each type of peripheral device has a unique identification, and if this unique identification is not present in software that is being transferred to the peripheral device for installation on the peripheral device, the peripheral device rejects the software being transferred to it.

DETAILED DESCRIPTION

Figure 1:
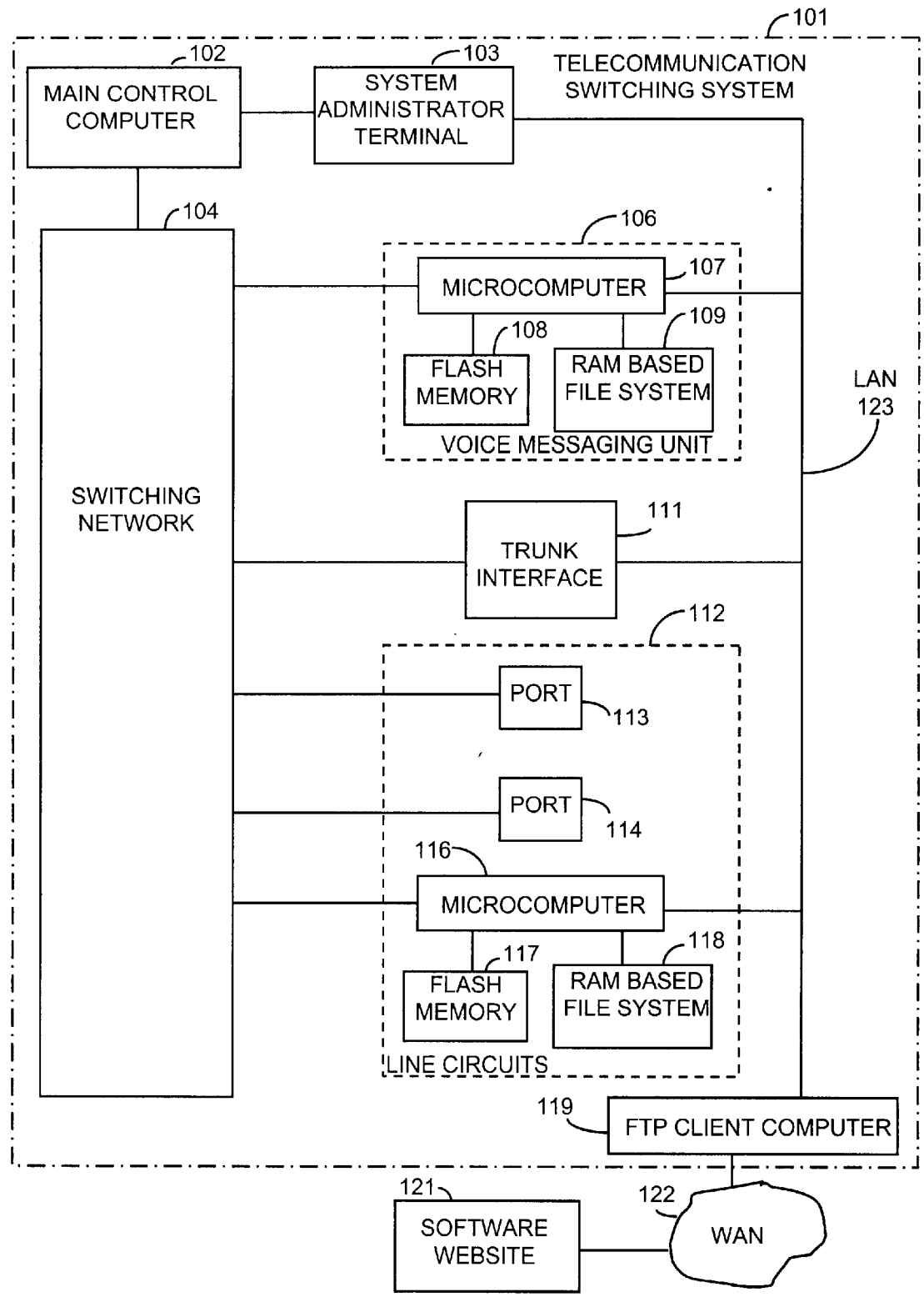
FIG. 1 illustrates, in block diagram form, one embodiment of the invention.

FIG. 1 illustrates one embodiment of the invention. Telecommunication switching system 101 is providing telecommunication services for a variety of customers who interface to the switching system via port circuits 113–114. The design and utilization of such port circuits is well known to those skilled in the art. In addition, telecommunication switching system 101 provides a voice messaging unit 106 that allows for the storage and retrieval of voice messages. Also, illustrated in FIG. 1 is trunk interface 111 that maybe a digital or analog interface unit. What is similar between units 106 and 111 is that they are providing complex functions that require each of these units to have a powerful microcomputer such as microcomputer 107 and their own flash memory and RAM based file system. These subunits are not illustrated for trunk interface 111. One skilled in the art would readily realize that a telecommunication switching system such as telecommunication switching system 101 would have a plurality of trunk interfaces and would also have a plurality of other units providing complex functions. These other units could comprise ATM interface circuits, tone detectors, voice analysis units, etc. Line circuits 112 illustrate a category of units that perform more simple operations, and each unit does not require the utilization of a sophisticated microcomputer such as microcomputer 107. Overall control for such units can be provided by a common microcomputer such as microcomputer 116. In addition, units such as port units 113–114 are normally found in great numbers on telecommunication switching systems hence their design has been optimized so as to eliminate any unnecessary units.

Microcomputer 116 with flash memory 117 and RAM based file system 118 support port circuits 113–114 and allow the downloading of software from FTP client computer 119 that will be transferred to port circuits 113–114.

Switching network 104 provides the digital switching that is necessary to perform the functions of a telecommunication switching system under control of main control computer 104. As is well known in the art, main control computer 102 controls the operations of units 106, 111, and 112. Not illustrated in FIG. 1, are the telephone sets and connections to the public network that would be established via trunk interfaces such as trunk interface 111. One skilled in the art would realize that telecommunication switching system 101 is only an example of a system that would have units such as 106 and 112 requiring the downloading of software. Other examples exist in the data switching system and general purpose computer areas.

Consider now the transfer of software from software site 121 to voice messaging unit 106. To initiate the transfer, a system administrator utilizes system administrator terminal 103. First, the system administrator requests that FTP client computer 119 requests the software which is to be downloaded from software web site 121 via wide area network (WAN) 122. When this is accomplished, the system administrator then instructs FTP client computer 119 to transfer the software to microcomputer 107. One skilled in the art would readily realize that system administrator terminal 103 and FTP client computer 119 could be the same computer which could be a personal computer (PC). FTP client computer 119 transfers the software file obtained from software web site 121 to microcomputer 107 via LAN 123. Microcomputer 107 accepts the software file and stores the software file in RAM based file system 109. Note, microcomputer 107 performs the functions of a voice messaging unit by executing a program stored in flash memory 108. Indeed, flash memory 108 is divided into two halves. Microcomputer 107 is either executing a program out of the first half of flash memory 108 or out of the second half of flash memory 108.

Figure 2:
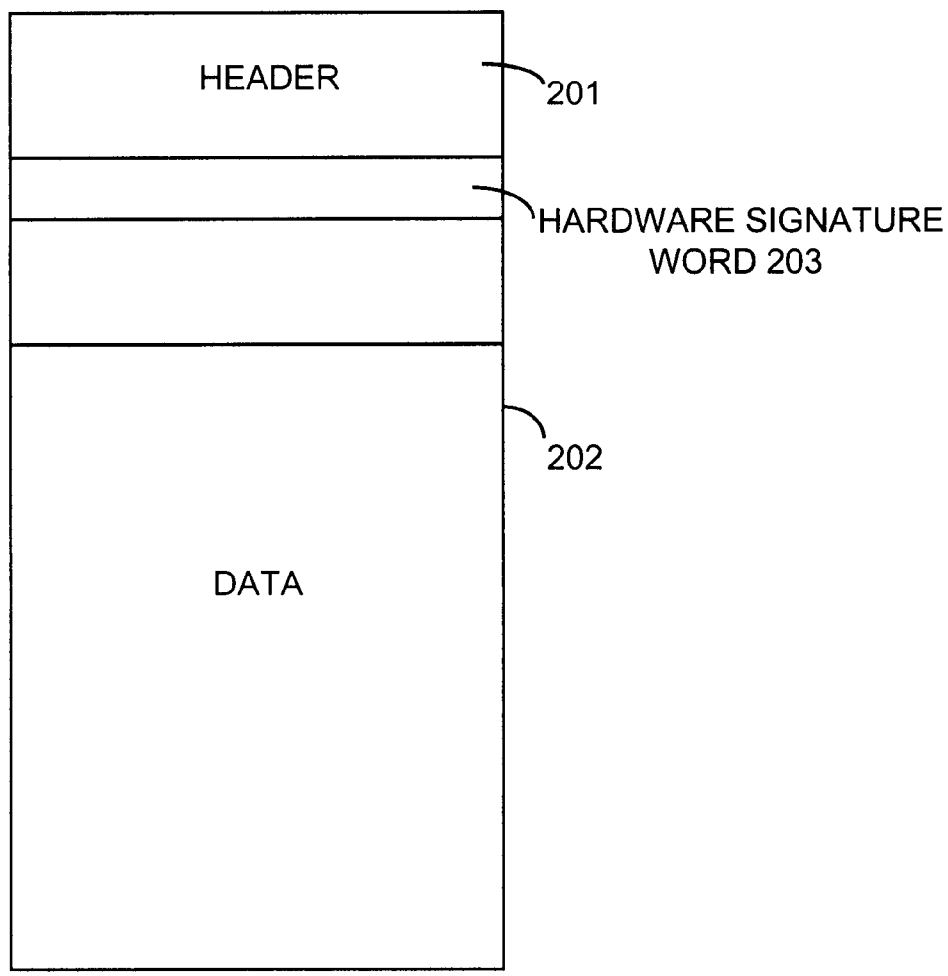
FIG. 2 illustrates the structure of a software file in one embodiment of the invention.

The software file containing the downloaded software is illustrated in FIG. 2. Header 201 defines various attributes of the file. The information in the header is utilized by main control computer 102 and microcomputer 107 to determine whether or not to accept the file. Header 201 contains words that define the CRC which provides checking on the correctness of the data of the downloaded file. The image size of the file that is used by the software of microcomputer 107 to compute the amount of time it will take to download the file. A word that defines the actual size and bytes of the header 201, and a code word that defines the board type of voice messaging unit 106. A vintage word that defines the software vintage of the software being loaded to voice messaging unit 106. A word defining the amount of time it will take to erase a one-half of flash memory 108. A word defining the identification number of microcomputer 107 for this particular software package. Indeed the various identification numbers and vintage numbers may not at all apply to voice messaging unit 106. Microcomputer 107 and main control computer 102 together have to determine if the software file is correct for voice messaging unit 106. In addition, there are words in the header defining the date that the file was created, the time of day that the file was created, and a word defining the copyright notice. In addition, there are words inserted simply to pad header 201 to the correct size. Also included in header 201 is a signature word in accordance with one embodiment of the invention that defines by a bit that is either set or not set whether or not this file should be stored in one-half of flash memory 108. This word is designated as hardware signature word 203.

Once, the software file has been download from FTP client computer 119 to RAM based file system 109, the system administrator via system administrator terminal 103 request that main control computer 102 transmit a message to microcomputer 107 to start the operations to have the software file moved from RAM based file system 109 to flash memory 108.

In response, main control computer 102 transmits a first message via switching network 104 to microcomputer 107. Microcomputer 107 is responsive to the message to transmit the header of the software file to main control computer 102. Main control computer 102 is responsive to the header of the software file to verify that voice message unit 106 is of the correct board type, compatible with the software vintage, and microcomputer type as defined in the header of the software file. If the board type, software vintage and microcomputer identification are correct, main control computer 102 transmits a second message to microcomputer 107 to start the operations to have the software file moved from RAM based file system 109 to flash memory 108.

Figure 3:
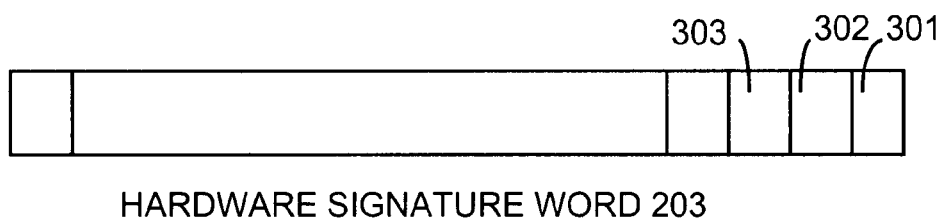
FIG. 3 illustrates a word within a header of FIG. 2.

Microcomputer 107 first exams the hardware signature of the header of the software file. Hardware signature word 203 is illustrated in greater detail in FIG. 3. Although not illustrated in FIG. 1, telecommunication switching system 101 could have a plurality of voice messaging units each requiring a different software package. Hardware signature word 203 has one bit for each of these voice messaging units. Note, that the previous information that was described in header 201 defining processor identification, board type and software vintage are not sufficient to assure that the proper software file is downloaded to a voice messaging unit. The hardware signature word 203 as illustrated in FIG. 3 has a unique bit for all of the various types of voice messaging units that could possibly exist on telecommunication switching system 101. The bit that is utilized for voice messaging unit 106 is bit 302. If bit 302 is set to a "1", microcomputer 107 loads the software file into RAM based file system 109. Note, that the other voice messaging units could also be capable of utilizing this software file, and if this is true, the bit in hardware signature word 203 for each of these other voice messaging units will also be set to a "1".

Consider now how a file would be downloaded from FTP client computer 119 to one of the port circuits 113–114. As before, the system administrator requests that the software file be put on FTP client computer 119 and requests that FTP client computer 119 transfers the software file to RAM based file system 118 of microcomputer 116. As is known by one skilled in the art, it is highly possible that there are different vintages and types of circuits which makeup port circuits 113–114. Before computer 116 transfers the software file from RAM based file system 118 to a given port circuit, it checks to make sure that that port circuit's bit is set in the hardware signature word. Once microcomputer 116 is assured that the bit is set in the hardware signature word, microcomputer 116 transfers the software file from RAM based file system 118 to the appropriate port circuits.

Figure 4:
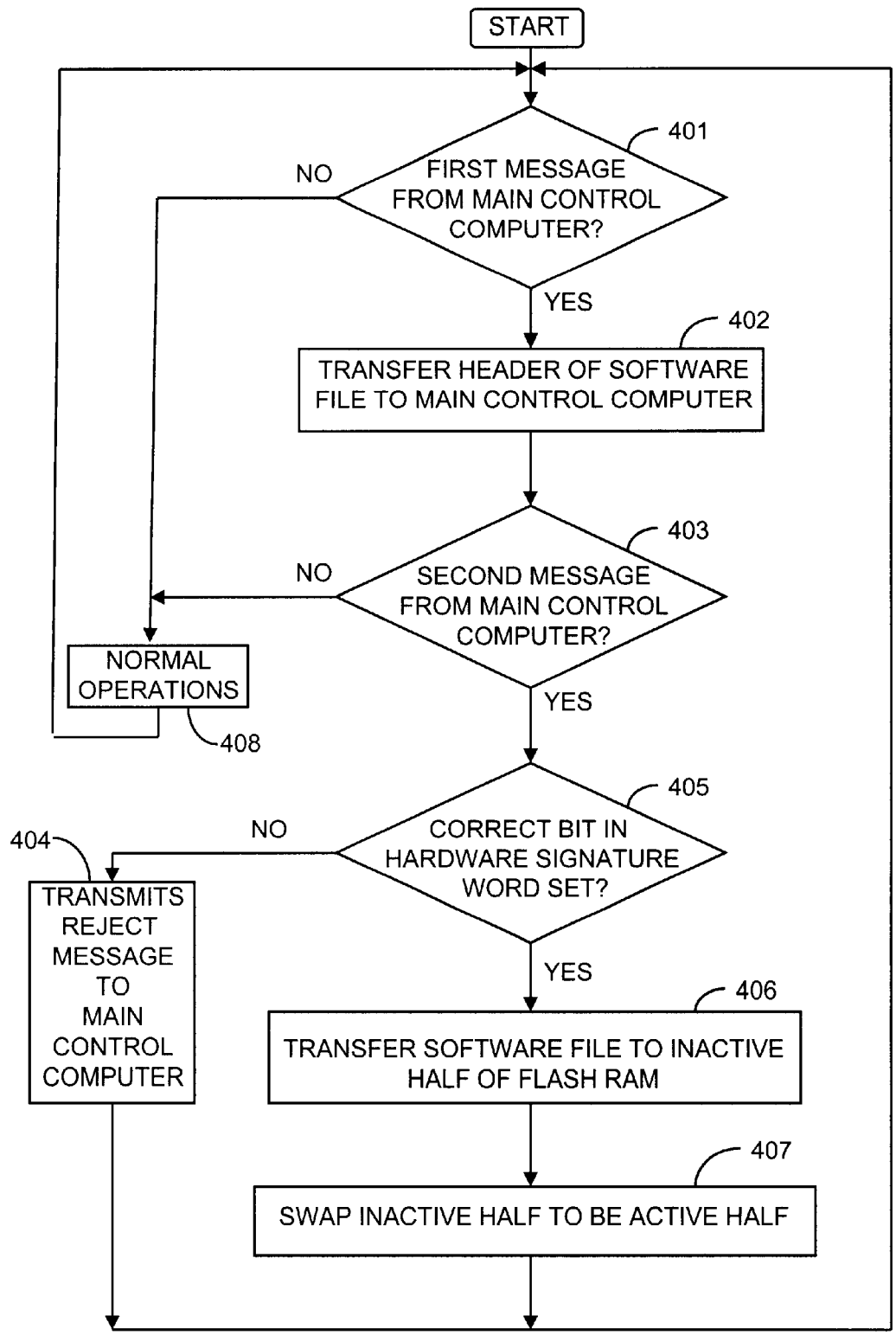
FIG. 4 illustrates, in flowchart form, the operations performed by one embodiment of the invention for downloading a software file for one unit.

FIG. 4 illustrates, in flowchart form, the operations performed by microcomputer 107 in one embodiment of the invention in performing the downloading of software from FTP client computer 119. After being started, decision block 401 checks to see if there is a first message from main control computer 102. If there is not, block 408 performs normal operations before transferring control back to decision block 401. If there is a first message from main computer 102, control is transferred to block 402 that transmits the header of the software file to main control computer 102. As is describe in more detail with respect to FIG. 6, main control computer 102 verifies the board type, software vintage, and microcomputer identification for voice messaging unit 106. If these items are correct, main control computer 102 transmits a second message to microcomputer 107. Decision block 403 checks for the second message from main control computer 102. If the second message is not received in a predefined time, control is transferred to block 408. If the second message is received, control is transferred to decision block 405.

Decision block 405 then checks to verify that the correct bit is set in the hardware signature word designating that microcomputer 107 is to utilize this software file. If the answer is no in decision block 405, block 404 transmits a reject message to main control computer 102 before transferring control back to decision block 401.

If the answer in decision block 405 is yes, block 406 transfers the software file from RAM based file system 109 to the inactive half of flash ROM 108 before transferring control to block 407. The latter block then swaps the inactive half with the presently active half before transferring control back to decision block 401.

Figure 5:
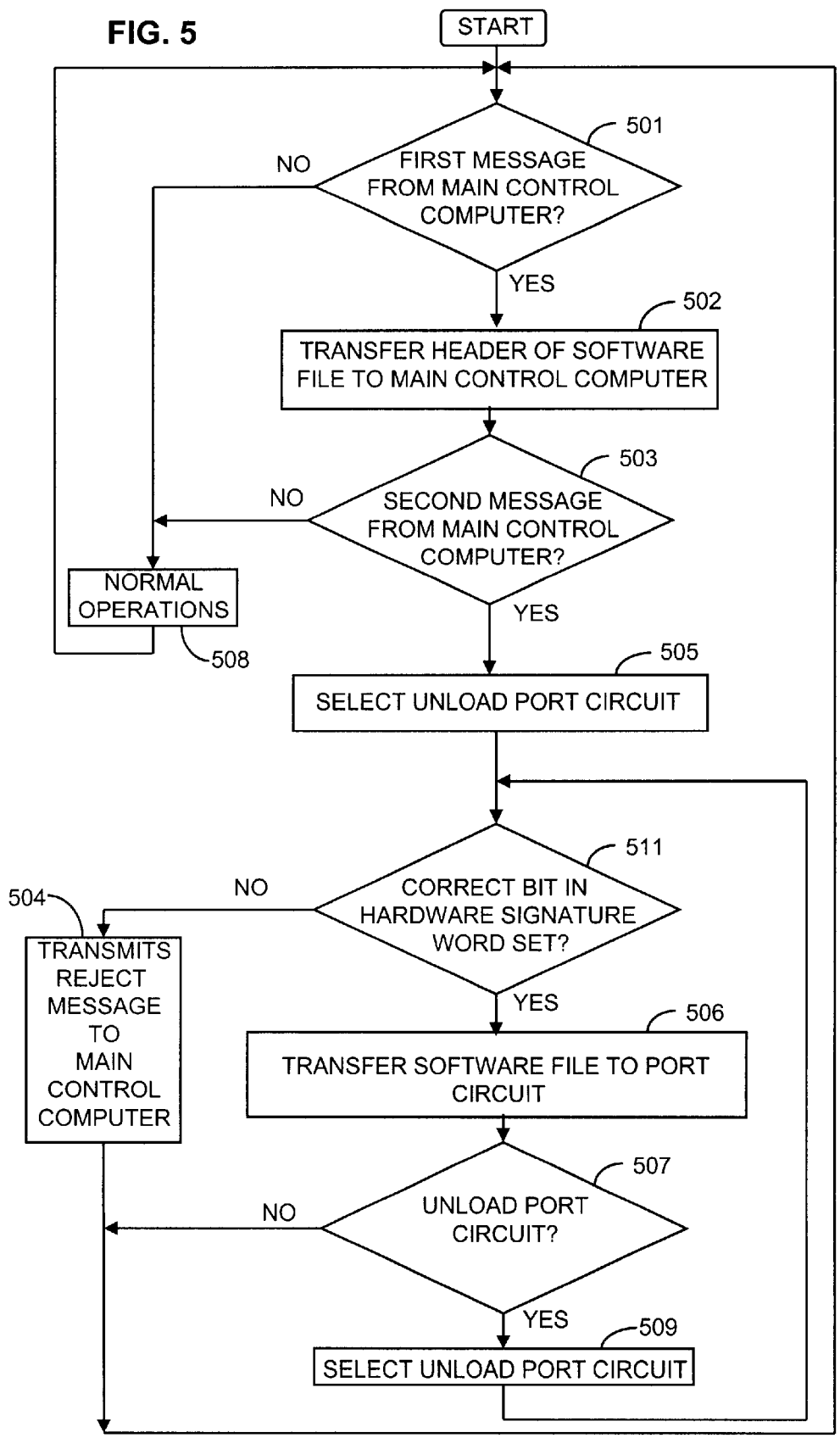
FIG. 5 illustrates, in flowchart form, operations performed by one embodiment of the invention for downloading a software file.

FIG. 5 illustrates, in flowchart form, the operations performed by microcomputer 116 in one embodiment of the invention in performing the downloading of software from FTP client computer 119. After being started, decision block 501 checks to see if there is a first message from main control computer 102. If there is not, block 508 performs normal operations before transferring control back to decision block 501. If there is a first message from main computer 102, control is transferred to block 502 that transmits the header of the software file to main control computer 102. As is described in more detail with respect to FIG. 6, main control computer 102 verifies the board type, software vintage, and microcomputer identification for line circuits board 112. If these items are correct, main control computer 102 transmits a second message to microcomputer 116. Decision block 503 checks for the second message from main control computer 102. If the second message is not received in a predefined time, control is transferred to block 508. If the second message is received, control is transferred to decision block 505. Block 505 then selects a port circuit whose software is to be updated. Decision block 511 then checks to verify that the correct bit is set in the hardware signature word designating that microcomputer 116 is to utilize this software file to load the selected port circuit. If the answer is no in decision block 511, block 504 transmits a reject message to main control computer 102 before transferring control back to decision block 501. Block 504 identifies the port circuit that could not be loaded in the reject message.

If the answer in decision block 511 is yes, block 506 transfers the software file from RAM based file system 109 to the selected port circuit before transferring control to block 507. The latter decision block determines if there are any port circuits whose software has not been updated. If the answer is no, decision block 507 transfers control back to decision block 501. If the answer is yes, control is transferred to block 509. The latter block selects an unloaded port circuit and transfer control to decision block 511.

Figure 6:
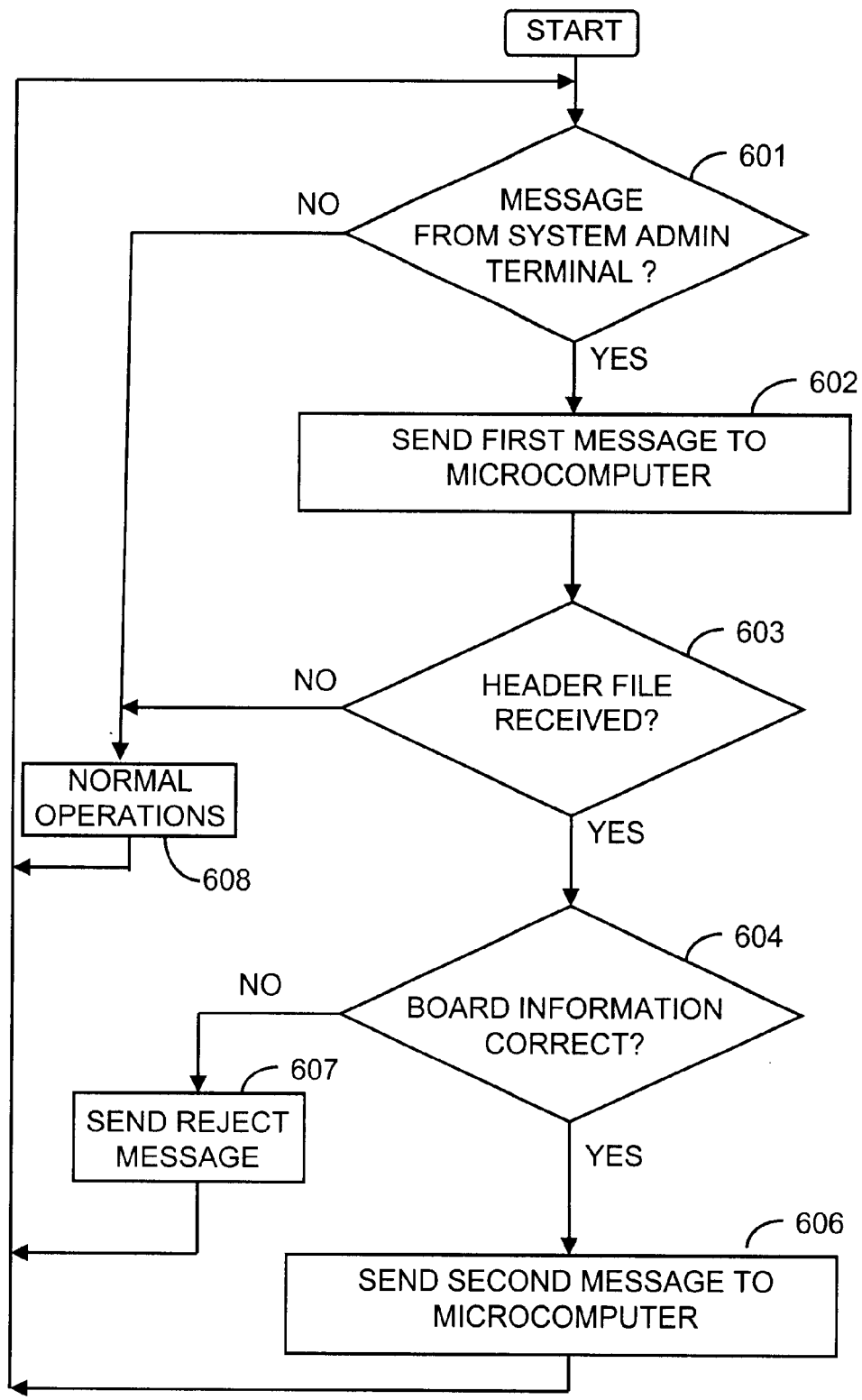
FIG. 6 illustrates, in flowchart form, operations performed by one embodiment of the invention for downloading a software file.

FIG. 6 illustrates, in flowchart form, the operations performed by main control computer 102 in one embodiment of the invention to perform the downloading of software from FTP client computer 119. After being started, decision block 601 checks to see if there is a message from system administrator terminal 103. If there is not, block 608 performs normal operations before transferring control back to decision block 601. If there is a first message from system administrator terminal 103, control is transferred to block 602 that requests the header of the software file from the microcomputer, such as microcomputer 107 or microcomputer 116. Decision block 603 then wait for a predefined time for a response, If a response is not received, control is transferred to block 608. If there is a response, control is transferred to decision block 604.

Decision block 604 verifies that the microcomputer identification, board type and software vintage are correct. If the answer in decision block 604 is no, control is transferred to block 607 that transmits a reject message to system administrator terminal 103 before transferring control back to decision block 601. If the answer in decision block 604 is yes, control is transferred to block 606 that transmits the second message to the microcomputer before transferring control back to decision block 601.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for downloading software file to a circuit board having a microcomputer and memory, comprising the steps of:

requesting a client computer to access the software file from a website;

accessing the software file by the client computer;

transferring the software file to the circuit board;

testing the software file to assure that the software file satisfies a first set of parameters for the circuit board;

testing the software file to assure that the software file satisfies a second set of parameters for the circuit board upon the software file satisfying the first set of parameters; and storing the software file into the memory by the microcomputer upon the software file satisfying the first set and second set of parameters for the circuit board.

2. The method of claim 1 wherein the step of requesting comprises the steps of transmitting a message from a system administrator terminal to a main control computer;

receiving the message by the main control computer; and re-transmitting the message to the client computer.

3. The method of claim 1 wherein the step of testing the software file for first set of parameters comprises the step of transmitting the software file by the microcomputer to the main control computer;

determining if the software file satisfies the first set of parameters for the circuit board by the main control computer; and transmitting the determination to the microcomputer.

4. The method of claim 3 wherein the step of testing the software file to assure that the software file satisfies a second set of parameters for the circuit board comprises receiving the determination from the main control computer.

5. The method of claim 1 wherein the step of transferring the software file to the circuit board comprises storing the software file in a RAM based file system on the circuit board.

6. The method of claim 5 the step of storing the software file into the memory comprises the steps of accessing the software file from the RAM based file system; and storing the accessed software file from the RAM based file system into the memory.

7. The method of claim 1 wherein the first set of parameters comprises at least one of software vintage identification, type of circuit board identification, and microcomputer identification.

8. The method of claim 1 wherein the second set of parameters comprises a single bit in a memory word.

9. A method for downloading a software file to a circuit board having a microcomputer and a first memory, comprising the steps of:

receiving by the microcomputer the software file from a client computer;

receiving by the microcomputer a first message from a main control computer;

transmitting by the microcomputer a header from the software file to the main control computer;

receiving a second message by the microcomputer from the main control computer;

testing the header by the microcomputer to determine if the header contains a parameter unique to the circuit board; and transferring the software file to the first memory upon the header containing the parameter unique to the circuit board.

10. The method of claim 9 wherein the step of receiving by the microcomputer the software file comprises the step of storing the software file in a second memory.

11. The method of claim 9 wherein the step of transferring the software file to the first memory comprises the steps of accessing the software file from the second memory; and storing the accessed software file into the first memory.

12. The method of claim 11 wherein the second memory is a RAM based file system.

13. The method of claim 9 wherein the parameter is a single bit in a memory word.

14. An apparatus for transferring a software file from a website to a circuit board having a microcomputer and a first and second memory, comprising the steps of:

a system administrator terminal transmitting a first request to a client computer;

the client computer responsive to the first request to access the software file from the website;

the client computer responsive to the accessed software file to store the accessed software file into the second memory;

the system administrator terminal further transmitting a second request to a main control computer;

the main control computer responsive to the second request to obtain the header from the second memory;

the main control computer responsive to the obtained header for testing the header for a first set of parameters and for transmitting a signal to the microcomputer if the first set of parameters are present in the header;

the microcomputer testing the header for a second set of parameters; and the microcomputer responsive to the second set of parameters being present in the header and receipt of the signal for transferring the software file from the first memory to the second memory.

15. The apparatus of claim 14 wherein the main control computer obtains the header by transmitting a first message to the microcomputer, and in responsive to the first message, the microcomputer transmits the header to the main control computer.

16. The apparatus of claim 15 wherein the main control computer signals the microcomputer if the first set of parameters are present in the header by transmitting a second message.

17. The apparatus of claim 14 wherein the first set of parameters comprises at least one of software vintage identification, type of circuit board identification, and microcomputer identification.

18. The apparatus of claim 14 wherein the second set of parameters comprises a single bit in a memory word.

19. The apparatus of claim 18 wherein the second memory is a RAM based file system.

* * * * *